United States Patent
Naoe et al.

(10) Patent No.: US 7,388,880 B2
(45) Date of Patent: Jun. 17, 2008

(54) DATA TRANSMISSION METHOD, TRANSMISSION CIRCUIT, AND COMMUNICATION DEVICE

(75) Inventors: Hitoshi Naoe, Nara (JP); Fumihiro Fukae, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1127 days.

(21) Appl. No.: 10/175,046

(22) Filed: Jun. 20, 2002

(65) Prior Publication Data

US 2003/0007511 A1 Jan. 9, 2003

(30) Foreign Application Priority Data

Jun. 21, 2001 (JP) ............................ 2001-188803

(51) Int. Cl.
*H04J 3/22* (2006.01)
*H04L 7/00* (2006.01)
*H03M 7/00* (2006.01)

(52) U.S. Cl. .................. 370/466; 341/50; 713/401
(58) Field of Classification Search ..................... None
See application file for complete search history.

(56) References Cited

U.S. PATENT DOCUMENTS

| 4,975,907 | A | * | 12/1990 | Dutruel et al. ............... 370/445 |
| 4,975,916 | A | * | 12/1990 | Miracle et al. ............. 714/798 |
| 5,138,634 | A | * | 8/1992 | Knapp ........................ 375/354 |
| 5,570,355 | A | | 10/1996 | Dail et al. |
| 2002/0122433 | A1 | * | 9/2002 | Pelley et al. ................ 370/466 |

* cited by examiner

*Primary Examiner*—Huy D. Vu
*Assistant Examiner*—Clemence Han
(74) *Attorney, Agent, or Firm*—Birch, Stewart, Kolasch & Birch, LLP

(57) ABSTRACT

In a data transmission method of the present invention, when transmission data are converted into the characters and the characters are transmitted as transmission signals in accordance with inputted data and a data transmission instruction, the interval between the data groups after the character conversion is broadened and then the characters are transmitted in a case where it is judged that the interval between the data groups after the character conversion is shorter than the interval between the data groups before the character conversion. This ensures communication devices to stably transmit and receive the data group even when the interval between the data groups after the character conversion is different from the interval between the data groups before the character conversion due to timing caused by the character conversion of the data.

17 Claims, 13 Drawing Sheets

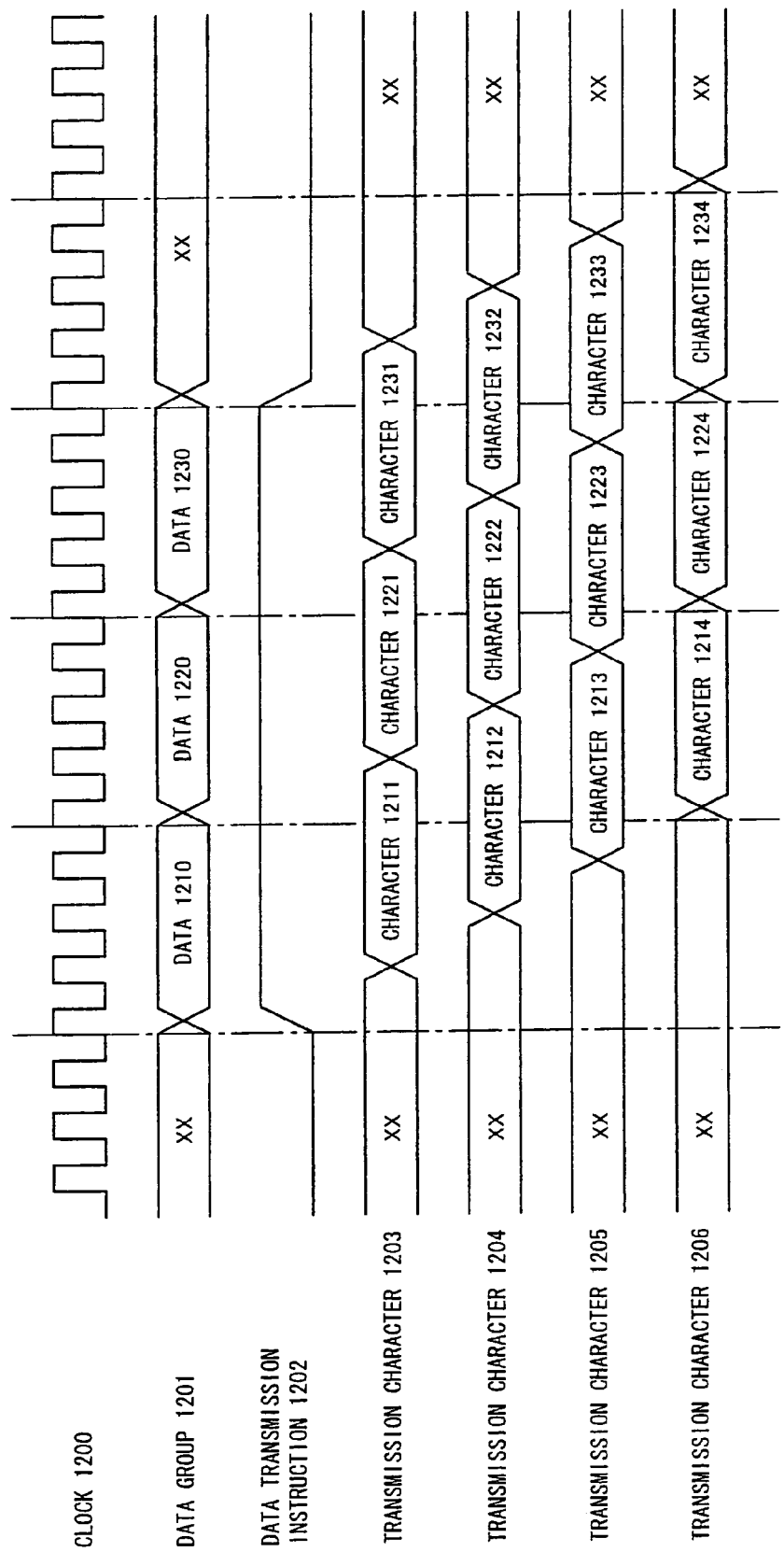

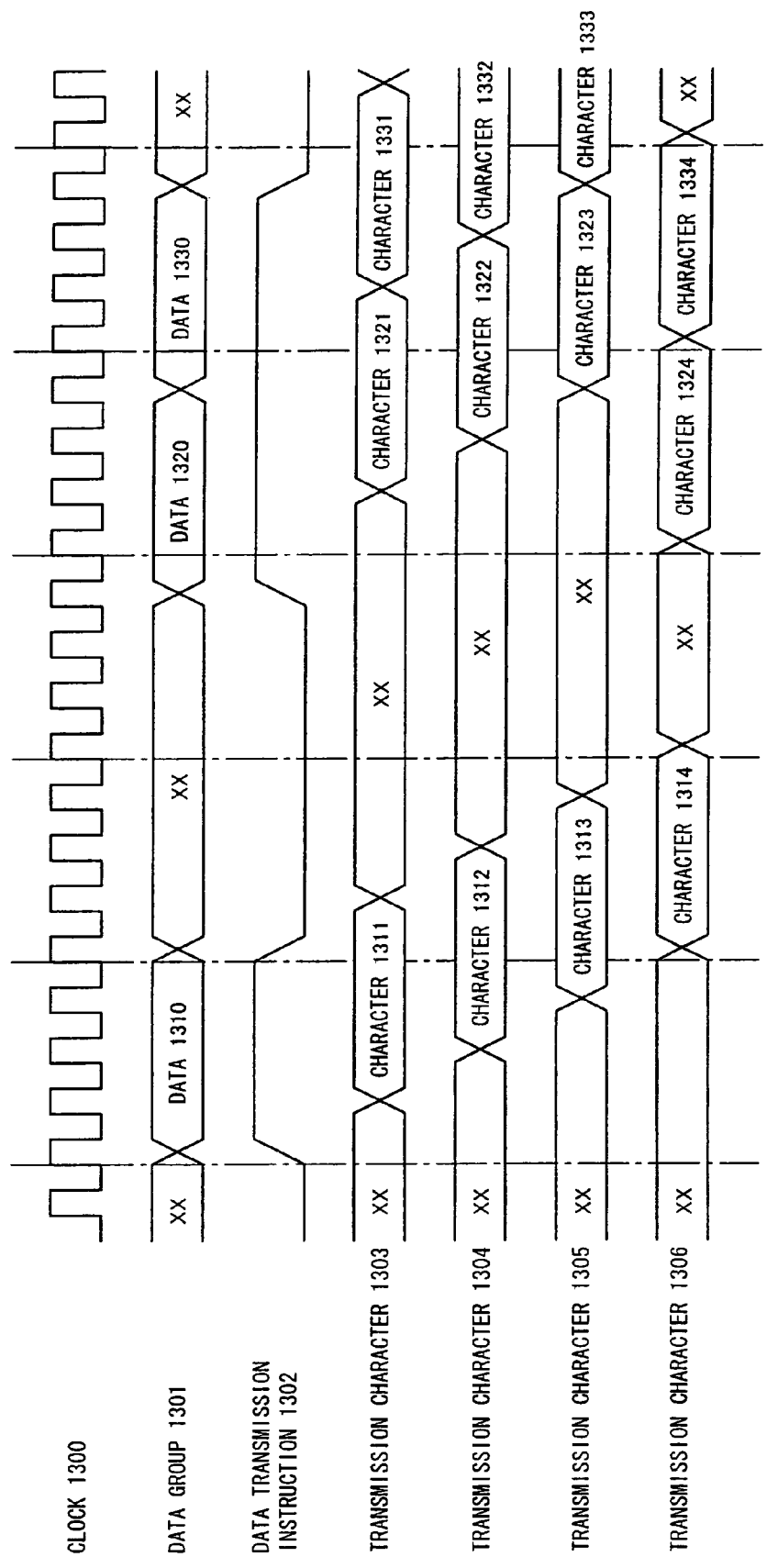

DATA TRANSMISSION METHOD, TRANSMISSION CIRCUIT, AND COMMUNICATION DEVICE

FIELD OF THE INVENTION

The present invention relates to a data transmission method, a transmission circuit and a communication device, which are respectively applied to serial communication in which information is communicated per unit of communication data (characters) having a larger bit number than original data.

BACKGROUND OF THE INVENTION

In recent years, in accordance with digitalization of information technology, high-speed serial communication of digital signals (hereinafter referred to as digital communication) has been widely used in, for example, data transmission between LSIs (large-scale integration), wireless communication, and optical fiber communication.

In the digital communication, it is required to send timing information in addition to transmission data so as to correctly sample data. Furthermore, most of the high-speed serial communication does not transmit the timing information via an extra line other than lines for transmitting data, to reduce the number of communication lines. Instead, coding is used with providing redundancy to the data, so as to ensure the data to be transited within a constant period.

In 8B10B coding as an example of the coding, a transmitting end converts 8-bit data and device state information into 10-bit characters and transmits the 10-bit characters, and then a receiving end converts back the received 10-bit characters into the 8-bit data and the device state information.

The transmitting end converts the data and the device information into the characters in accordance with timings shown in FIG. 12, for example.

More specifically, in FIG. 12, in the case where a cycle of a clock 1200 for operating a system is one-fourth of a cycle of transmission characters, when a data transmission instruction 1202 demands transmission and data 1210, 1220, and 1230 in a data group 1201 are transmitted, the data 1210, 1220 and 1230 are converted into the characters in accordance with timings of character groups 1203 through 1206.

Here, characters 1211 to 1214 are converted from the data 1210, characters 1221 to 1224 are converted from the data 1220, and characters 1231 to 1234 are converted from the data 1230.

However, when the technique is carried out, an interval between the data groups may change due to timing when the data is converted into the characters. This may occur when the interval between the data groups becomes a value that cannot be divided by a time unit of the characters. For example, when the character unit is 80 ns, the interval between the character groups, which are converted from the data group, becomes 640 ns or 720 ns, in a case where a closest value of the character unit, namely the interval between the data groups (before the character conversion) is 700 ns. Then, when the character unit is 640 ns, a receiving device may not be able to capture the data group.

Specifically, as shown in FIG. 13, in the case where a cycle of a clock 1300 for operating the system is one-fourth of a cycle of the transmission characters, when the data transmission instruction 1302 demands transmission and data 1310, 1320 and 1330 in the data group 1301 are transmitted, in which an interval between the data 1310 and the data 1320 is seven cycles of the clock, an interval between characters 1311 to 1313 converted from the data 1310 and characters 1321 to 1323 converted from the data 1320 becomes eight cycles of the clock in transmission character groups 1303, 1304 and 1305, whereas an interval between the data 1314 converted from the data 1310 and the data 1324 converted from the data 1320 becomes four cycles of the clock in a transmission character group 1306, after the character conversion is carried out.

As described above, in the serial communication in which the device state information and the data group are transmitted and received per character unit, the interval between the data groups may be changed.

In such a case, it does not matter when the interval between the data groups after the character conversion becomes identical with or longer than the interval between the data groups before the character conversion. However, when the interval between the data groups after the character conversion becomes smaller than a constant value, due to timing caused by the character conversion, (a) a receiving device or (b) the other device to which the receiving device has transmitted the received data group via a channel in which a communication mode is not specified, cannot capture the data group.

Therefore, the conventional transmission method in which the data are converted into the characters may cause a problem that the receiving device cannot stably receive the data group after the character conversion, in other words, the transmitting device and the receiving device cannot stably communicate with each other (cannot transmit and receive the data group).

SUMMARY OF THE INVENTION

An object of the present invention is to provide a data transmission method, a transmission circuit and a communication device, which can stably transmit and receive a data group between the communication devices even when an interval between the data groups after character conversion is different from an interval between the data groups before the character conversion due to timing caused by the character conversion of the data.

In order to achieve the object, a data transmission method, in which transmission data are converted into characters and information is communicated per character unit has the step of broadening an interval between data groups after character conversion when the interval between the data groups after the character conversion is shorter than an interval between the data groups before the character conversion.

According to the arrangement, it can be prevented that (a) a receiving device or (b) the other device to which the receiving device has transmitted the received data group via a channel in which a communication mode is not specified, cannot capture the data group when the interval between the data groups after the character conversion is shorter than the interval between the data groups before the character conversion.

Because of this, even when the interval of the data groups after the character conversion is different from the interval between the data groups before the character conversion, the receiving device can always receive the data group, thereby ensuring the transmitting device and the receiving device to stably communicate with each other.

Moreover, the interval between the data groups after the character conversion may be broadened when the interval between the data groups after the character conversion is shorter than the interval between the data groups before the character conversion and smaller than a constant value.

In this case, it is assumed that the receiving device cannot capture the data group when the interval between the data groups after the character conversion is smaller than the constant value which is specified as a reference value for judging whether the receiving device properly captures the data group. Then, the interval between the data groups after the character conversion may be broadened only when the interval between the data groups after the character conversion is shorter than the interval between the data groups before the character conversion and smaller than the constant value.

Therefore, the processing is not always carried out to broaden the interval between the data groups after the character conversion when the interval between the data groups after the character conversion is shorter than the interval between the data groups before the character conversion, thereby preventing an unnecessary delay.

Moreover, the interval between the data groups after the character conversion may be broadened when the interval between the data groups after the character conversion is shorter than the interval between the data groups before the character conversion and within a constant range.

In this case, it is assumed that the constant range is specified as a range in which the receiving device cannot capture the data group. Then, the interval between the data groups after the character conversion may be broadened only when the interval between the data groups after the character conversion is shorter than the interval between the data groups before the character conversion and within the constant range.

Therefore, the processing is not always carried out to broaden the interval between the data groups after the character conversion when the interval between the data groups after the character conversion is shorter than the interval between the data groups before the character conversion, thereby preventing the unnecessary delay.

For a fuller understanding of the nature and advantages of the invention, reference should be made to the ensuing detailed description taken in conjunction with the accompanying drawings.

BRIEF DESCRIPTION OF THE DRAWINGS

FIG. 12 is an explanatory diagram of phases when a data group is converted into characters.

FIG. 13 is an explanatory diagram showing a case where an interval between the data groups changes due to the character conversion.

DESCRIPTION OF THE EMBODIMENTS

First Embodiment

An embodiment of the present invention is explained below, referring to FIGS. 1 and 2. Note that, in the present embodiment, explained is a communication device including a transmission circuit applied with a communication method of the present invention. Furthermore, in the present embodiment, for convenience, only a data group and a data transmission instruction are used for explanation, but a device that additionally transmits device state information can be explained in a same way as transmission operations of the data group and the data transmission instruction.

Figure 1:
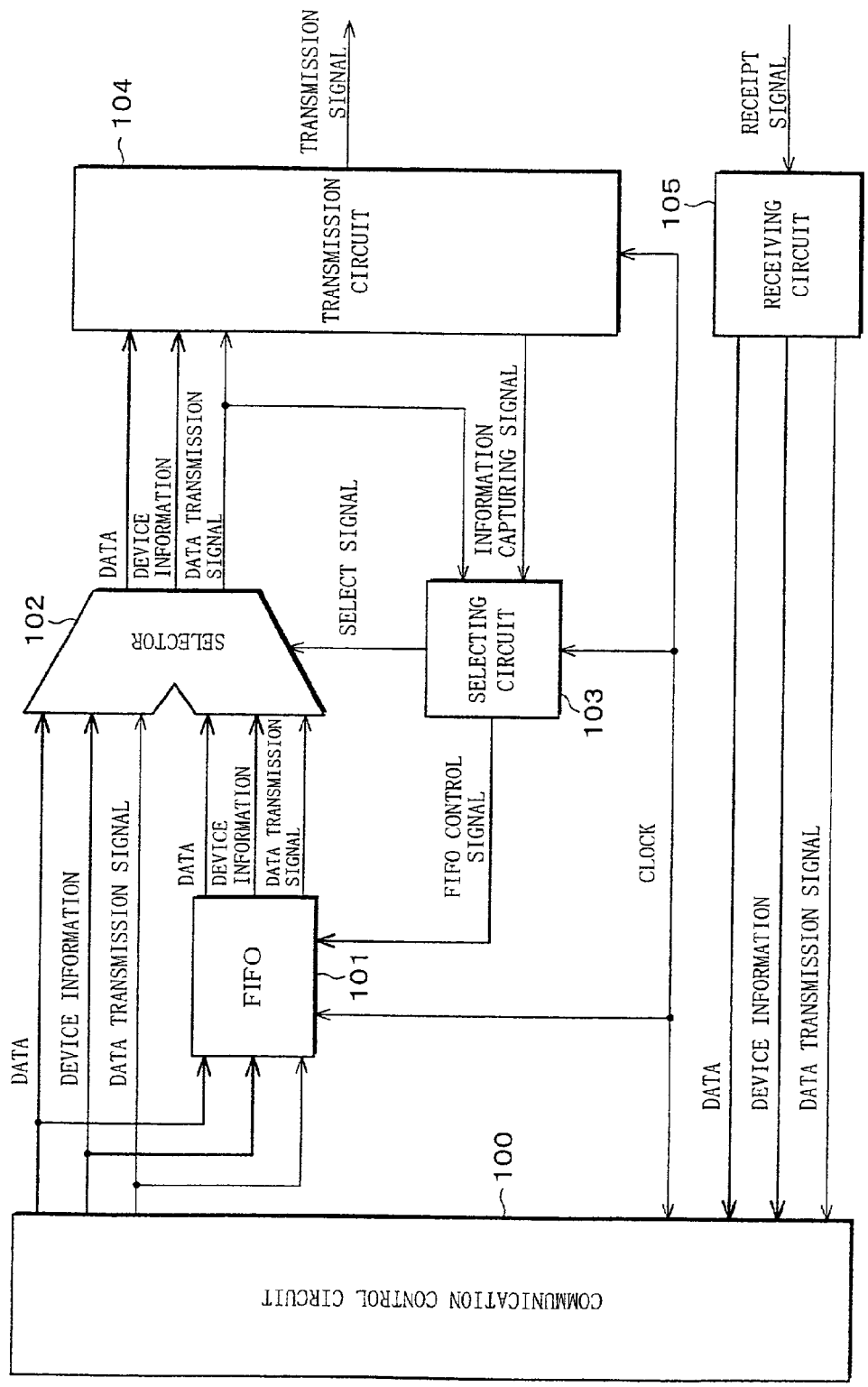
FIG. 1 is a schematic block diagram of a communication device in accordance with a first embodiment of the present invention.

The communication device in accordance with the present embodiment includes a communication control circuit 100, an FIFO (first-in first-out) 101, a selector 102, a selection circuit 103, a transmission circuit 104, and a receiving circuit 105, as shown in FIG. 1, for example.

The communication control circuit 100 receives and transmits data and information of device (device information, the data transmission instruction, and a data receipt signal), thereby controlling communication in the communication device.

The FIFO 101 stores the data, the device information, and the data transmission instruction from the communication control circuit 100, and outputs the data, the device information, and the data transmission instruction to the selector 102 in accordance with an FIFO control signal from the selection circuit 103.

The selector 102 selects one of the signals (the data, the device information, and the data transmission instruction) from the communication control circuit 100 and the FIFO 101 in accordance with a select signal from the selection circuit 103 and outputs the selected signal into the transmission circuit 104.

The transmission circuit 104 converts the signals from the selector 102 (the data and the device information) into characters and serially outputs the characters as transmission signals.

The communication control circuit 100, the FIFO 101, the selection circuit 103, and the transmission circuit 104 respectively receive a clock for timing output signals and other signals in respective circuits.

Note that, the selection circuit 103 generates the select signal and the FIFO control signal in accordance with the data transmission instruction from the selector 102 and an information capturing signal from the transmission circuit 104 in accordance with a timing of receiving the clock, and outputs the select signal to the selector 102 and outputs the FIFO control signal to the FIFO 101.

When the receiving circuit 105 receives the characters as receipt signals from the other device, the receiving circuit 105 converts the characters into the data, the device information, and the data receipt signal, respectively, and outputs the signals into the communication control circuit 100.

Figure 2:
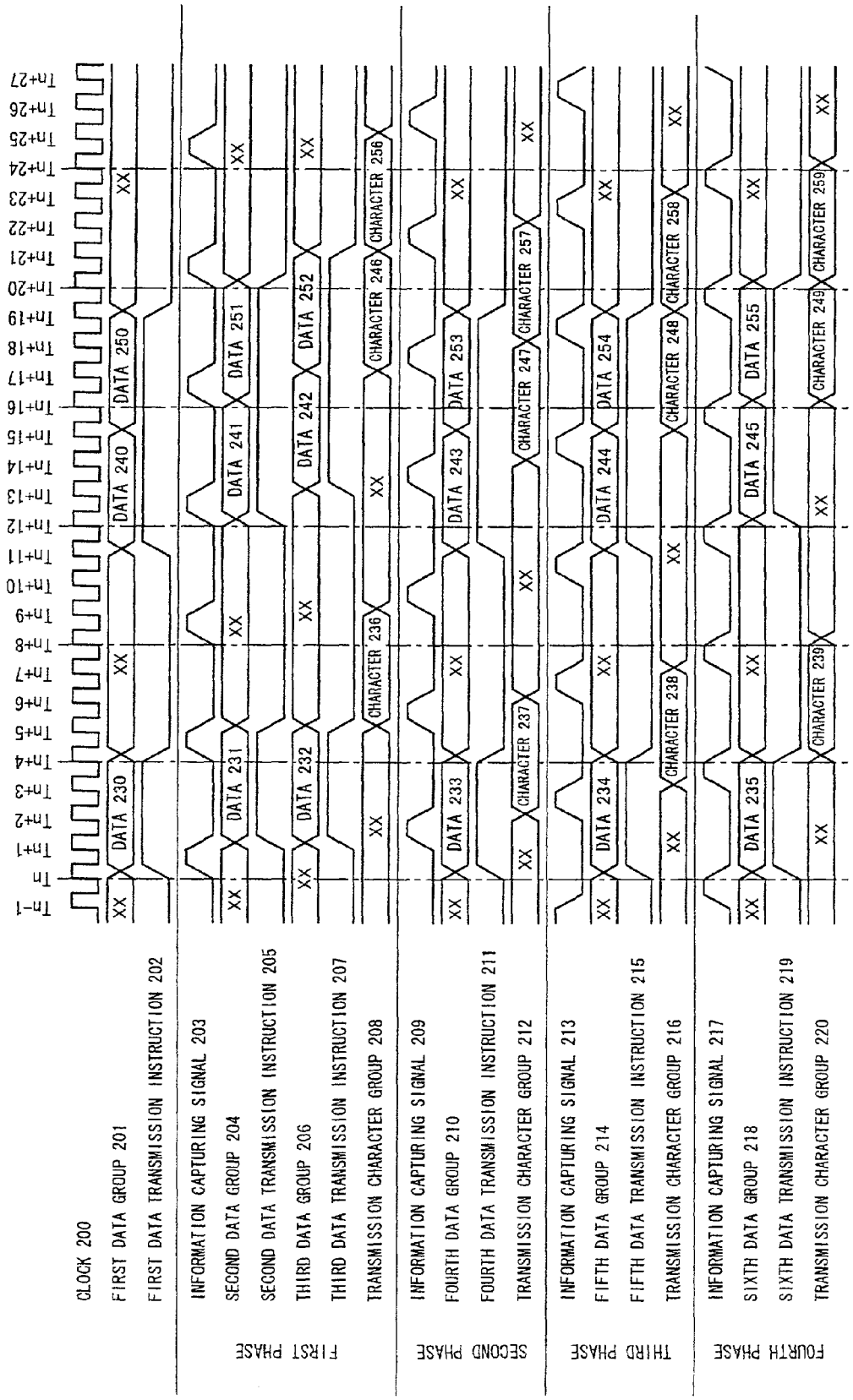
FIG. 2 is a view for explaining an operation of data transmission by the communication device shown in FIG. 1.

Here, the following explanation deals with an operation of data transmission in the communication device of the arrangement, referring to a block diagram shown in FIG. 1 and a timing chart shown in FIG. 2.

Note that, in FIG. 2, the following explanation deals with a case where (a) a transmitting-end circuit (the transmission circuit 104) is operated in accordance with a clock 200, (b) an operation cycle of the data and the characters is four times as long as the clock 200, (c) one cycle of the clock 200 is delayed at a time, (d) the data transmission instruction and the information capturing signal operate based on positive logic in which transmission is demanded and information is captured when the signal is High. The present invention is, however, not limited to these conditions.

Furthermore, a first data group 201 and a first data transmission instruction 202, which are outputted from the communication control circuit 100, as shown in FIG. 2, have an identical timing with the data group 1301 and the data transmission instruction 1302, and therefore shortens an interval between the data groups depending on timing of the information capturing signal.

The communication device that converts information into the characters and then transmits the characters is required to generate a signal (the information capturing signal) for cyclically capturing information in accordance with a cycle of the characters. In the present embodiment, the transmission circuit 104 outputs the information capturing signal to the selection circuit 103.

In other words, in the transmission circuit 104, the signal for capturing information (the information capturing signal) is generated for every 4 clocks, in the case where the cycle of the characters is four times as long as the clock. Timing of the signals has four phases, which are information capturing signals 203, 209, 213, and 217.

FIG. 2 shows a case where the first data group 201 and the first data transmission instruction 202 are inputted in each of the four phases.

First, the following explanation deals with a case where information is captured in accordance with the information capturing signal 203 from the first data group 201 and the first data transmission instruction 202 in a first phase.

In the first phase, at time Tn−1, the selection circuit 103 outputs the select signal to the selector 102 so that the selector 102 selects and outputs the signal from the communication control circuit 100 to the transmission circuit 104. More specifically, at time Tn, the information capturing signal 203 turns to High, whereas the first data transmission instruction 202 turns to High from Low. At this point, the selection circuit 103 outputs the control signal to the FIFO 101 so that the FIFO 101 outputs a signal that is a resultant of delaying for a cycle of the clock 200 with respect to the first data group 201 and the first data transmission instruction 202, and outputs the select signal to the selector 102 so that the selector 102 selects and outputs the signal from the FIFO 101. This ensures to change the first data group 201 and the first data transmission instruction 202 into a second data group 204 and a second data transmission instruction 205, respectively.

Then, the second data transmission instruction 205 once turns to Low at Time Tn+5, and turns to High again at Tn+12. At this point, since the information capturing signal 203 is also High, the selection circuit 103 outputs the control signal to the FIFO 101 so that the FIFO 101 outputs a signal that is a resultant of delaying for two cycles of the clock 200 with respect to the first data group 201 and the first data transmission instruction 202, and outputs the select signal to the selector 102 so that the selector 102 selects and outputs the signal from the FIFO 101.

In this way, in the first phase, the first data group 201 and the first data transmission instruction 202 are ultimately converted into a third data group 206 and a third data transmission instruction 207. When converting the third data group 206 and the third data transmission instruction 207 into the characters with using the information capturing signal 203, a transmission character group 208 can be obtained, and an interval between a character 236 converted from data 230 and a character 246 converted from data 240 is two cycles of the characters.

Next, the following explanation deals with a case where information is captured in accordance with the information capturing signal 209 from the first data group 201 and the first data transmission instruction 202 in a second phase.

At the time Tn−1, the selection circuit 103 outputs the select signal to the selector 102 so that the selector 102 selects and outputs the signal from the communication control circuit 100 to the transmission circuit 104. More specifically, the first data transmission instruction 202 turns to High at time Tn+1, whereas the information capturing signal 209 turns to High at the time Tn+1. Since the timing the first data transmission instruction 202 to start is not synchronous to the timing the information capturing signal to turn to High, the selection circuit 103 does not change the select signal.

Furthermore, the first data transmission instruction 202 once turns to Low at time Tn+4, and turns to High again at the time Tn+11, but the information capturing signal 209 turns to High at time Tn+9 and Tn+13, so that the selection circuit 103 does not change the select signal.

As a result, a fourth data group 210 and a fourth data transmission instruction 211, which are outputted from the selector 102, have an identical timing with the first data group 201 and the first data transmission instruction 202. When converting the fourth data group 210 and the fourth data transmission instruction 211 into the characters with using the information capturing signal 209, a transmission character group 212 can be obtained, and an interval between a character 237 converted from the data 230 and a character 247 converted from the data 240 is two cycles of the characters.

Next, the following explanation deals with a case where information is captured in accordance with the information capturing signal 213 from the first data group 201 and the first data transmission instruction 202 in a third phase.

At the time Tn−1, the selection circuit 103 outputs the select signal to the selector 102 so that the selector 102 selects and outputs the signal from the communication control circuit 100 to the transmission circuit 104. More specifically, the first data transmission instruction 202 turns to High at the time Tn, whereas the information capturing signal 213 turns to High at time Tn+2. Since the timing the first data transmission instruction 202 to start is not synchronous to the timing the information capturing signal to turn to High, the selection circuit 103 does not change the select signal.

Furthermore, the first data transmission instruction 202 once turns to Low at the time Tn+4, and turns to High again at time Tn+11, but the information capturing signal 213 also turns to High at Tn+10 and Tn+14, so that the selection circuit 103 does not change the select signal.

As a result, a fifth data group 214 and a fifth data transmission instruction 215, which are outputted from the selector 102, have an identical timing with the first data group 201 and the first data transmission instruction 202. When converting the fifth data group 214 and the fifth data transmission instruction 215 into the characters with using the information capturing signal 213, a transmission character group 216 can be obtained, and an interval between a character 238 converted from the data 230 and a character 248 converted from the data 240 is two cycles of the characters.

Finally, the following explanation deals with a case where information is captured in accordance with the information capturing signal 217 from the first data group 201 and the first data transmission instruction 202 in a fourth phase.

At the time Tn−1, the selection circuit 103 outputs the select signal to the selector 102 so that the selector 102 selects and outputs the signal from the communication control circuit 100 to the transmission circuit 104. More specifically, the first data transmission instruction 202 turns to High at the time Tn, whereas the information capturing signal 213 turns to High at the time Tn−1 and Tn+3. Since the timing the first data transmission instruction 202 to start is not synchronous to the timing the information capturing signal to turn to High, the selection circuit 103 does not change the select signal.

Furthermore, the first data transmission instruction 202 once turns to Low at the time Tn+4, and turns to High again at the time Tn+11, but the information capturing signal 217 also turns to High at the time Tn+11. At this point, the selection circuit 103 outputs the control signal to the FIFO 101 so that the FIFO 101 outputs a signal that is a resultant of delaying for a cycle of the clock 200 with respect to the first data group 201 and the first data transmission instruction 202, and outputs the select signal to the selector 102 so that the selector 102 selects and outputs the signal from the FIFO 101. This ensures to change the first data group 201 and the first data transmission instruction 202 into a sixth data group 218 and a sixth data transmission instruction 219, respectively.

When converting the sixth data transmission group 218 and the sixth data transmission instruction 219 into the characters with using the information capturing signal 217, a transmission character group 220 can be obtained, and an interval between a character 239 converted from the data 230 and a character 249 converted form the data 240 is two cycles of the characters.

As described above, according to the present invention, it is possible to broaden the interval between the data groups after the character conversion with respect to the data group and the data transmission instruction in which the character conversion shortens the interval between the data groups, thereby preventing a defect in receiving data in the communication device provided with the receiving circuit which cannot receive data when the interval between the data groups is shortened after the character conversion.

Second Embodiment

Another embodiment of the present invention is explained below, referring to FIGS. 3 and 4. Note that, in the present embodiment, explained is a communication device including the transmission circuit applied with the communication method of the present invention. Furthermore, in the present embodiment, for convenience, only the data group and the data transmission instruction are used for explanation, but a device that additionally transmits the device state information can be explained in a same way as transmission operations of the data group and the data transmission instruction.

Figure 3:
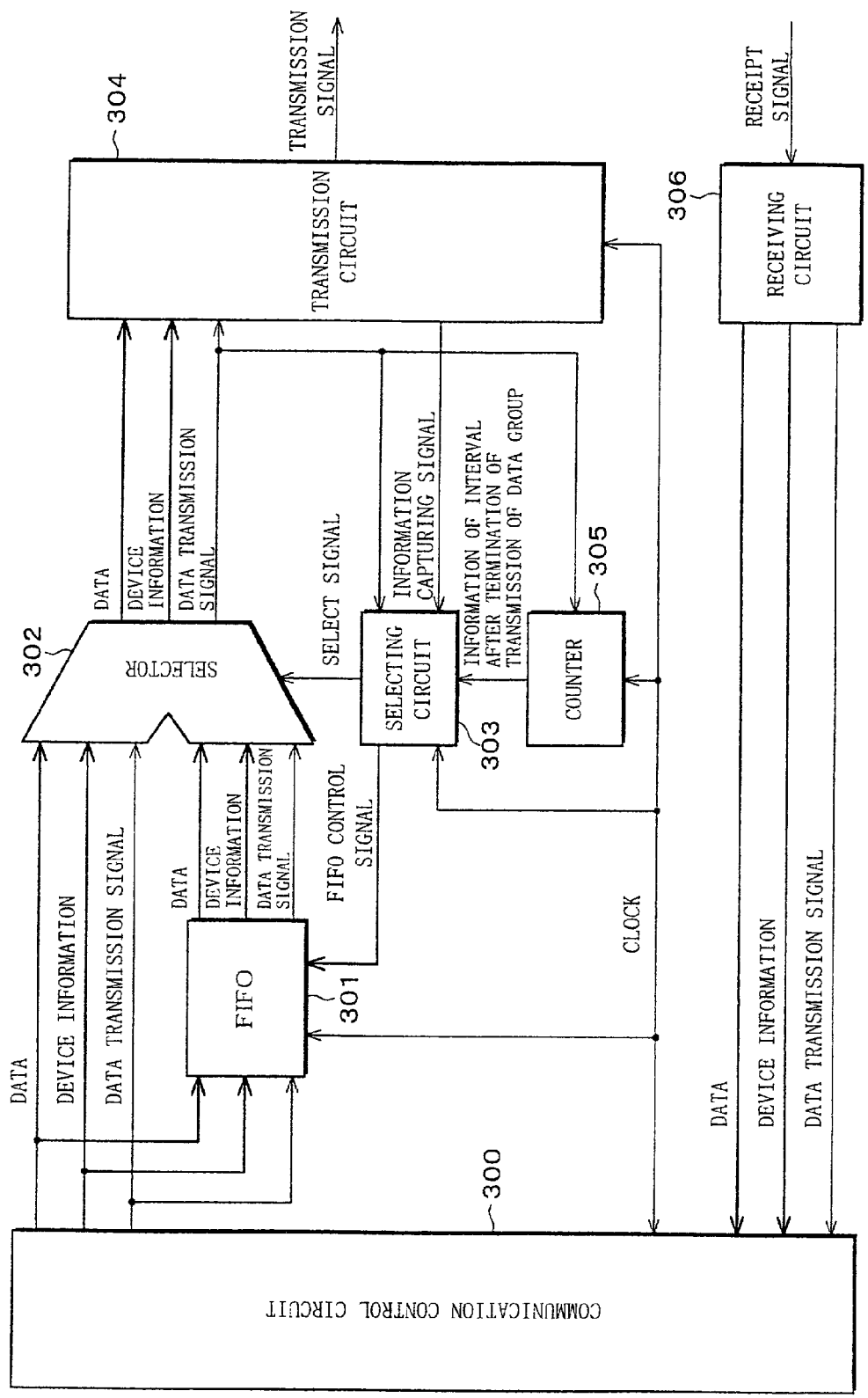
FIG. 3 is a schematic block diagram of a communication device in accordance with second and third embodiments of the present invention.

The communication device in accordance with the present embodiment includes a communication control circuit 300, an FIFO 301, a selector 302, a selection circuit 303, a transmission circuit 304, a counter 305, and a receiving circuit 306, as shown in FIG. 3.

Note that, the constituent members other than the counter 305 have same functions as those of the communication device shown in FIG. 1 in the first embodiment, thus their detailed explanation is omitted here.

The counter 305 counts time after the previous data transmission instruction turns to Low, upon receipt of the data transmission instruction from the selector 302. The counter 305 outputs in accordance with the counted value to the selection circuit 303 information of an interval after the termination of the transmission of the data group.

The selection circuit 303 generates (a) the select signal to be outputted to the selector 302 and (b) the FIFO control signal to be outputted to the FIFO 301 in accordance with the output from the counter 305 and the information capturing signal from the transmission circuit 304. The details are described later.

Here, an operation of data transmission in the communication device having the above arrangement is explained below, referring to a block diagram shown in FIG. 3 and a timing chart shown in FIG. 4.

Figure 4:
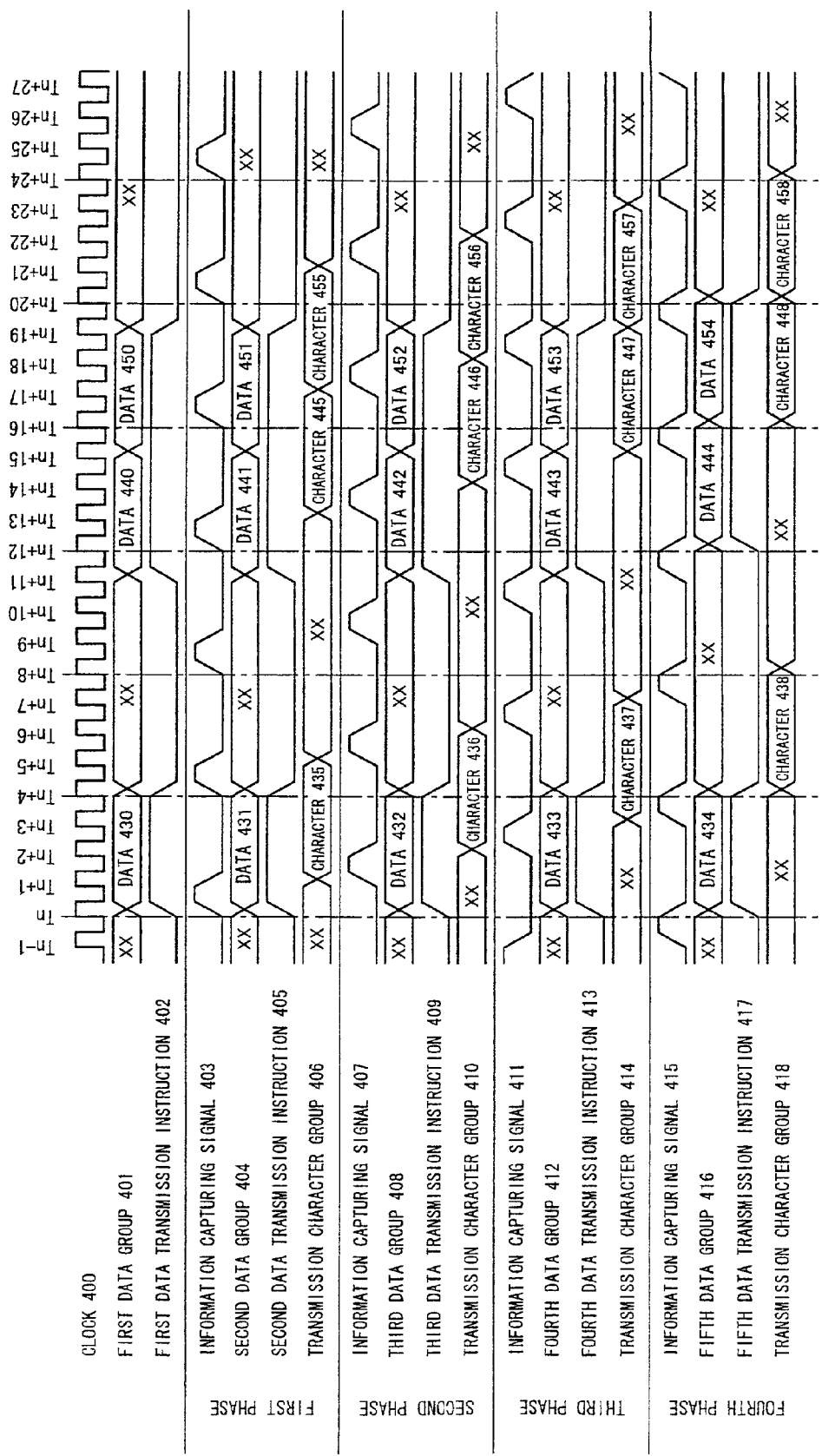
FIG. 4 is a diagram for explaining an example of an operation of data transmission by the communication device shown in FIG. 3.

Note that, in FIG. 4, the following explanation deals with a case where (a) a transmitting-end circuit (the transmission circuit 304) is operated in accordance with a clock 400, (b) an operation cycle of the data and the characters is four times as long as the clock 400, (c) one cycle of the clock 400 is delayed at a time, (d) the data transmission instruction and the information capturing signal operate based on positive logic in which transmission is demanded and information is captured when the signal is High. The present invention is, however, not limited to these conditions.

Furthermore, a first data group 401 and a first data transmission instruction 402, which are outputted from the communication control circuit 300, as shown in FIG. 4, have an identical timing with the data group 1301 and the data transmission instruction 1302, which are explained in the description of the conventional art. The first data group 401 and the first data transmission instruction 402 shorten an interval between the data groups depending on timing of the information capturing signal. Furthermore, it is assumed that the data group is not transmitted for a sufficient period before data 430.

The communication device that converts information into the characters and then transmits the characters is required to generate a signal (the information capturing signal) for cyclically capturing information in accordance with a cycle of the characters. In the present embodiment, the transmission circuit 304 outputs the information capturing signal to the selection circuit 303.

In other words, in the transmission circuit 304, the signal for capturing information (the information capturing signal) is generated for every 4 clocks, in the case where the cycle of the characters is four times as long as the clock. Timing of the signals has four phases, which are information capturing signals 403, 407, 411, and 415.

FIG. 4 shows a case where the first data group 401 and the first data transmission instruction 402 are inputted in each of the four phases. Note that, it is assumed that the first data group 401 and the first data transmission instruction 402 are inputted, and the first data transmission instruction 402 is Low for not less than a constant period before the time Tn.

First, the following explanation deals with a case where information is captured in accordance with the information capturing signal 403 from the first data group 401 and the first data transmission instruction 402 in a first phase.

At the time Tn−1, the selection circuit 303 outputs the select signal to the selector 302 so that the selector 302 selects and outputs the signal from the communication control circuit 300 to the transmission circuit 304. More specifically, at the time Tn, the information capturing signal 403 turns to High, and the first data transmission instruction 402 turns to High from Low. Meanwhile, the counter 305 judges that a sufficient period has passed after the first data transmission instruction 402 turns to Low from High before the time Tn and sends information in accordance with the judgement to the selection circuit 303, so that the selection circuit 303 does not change the select signal.

The first data transmission instruction 402 once turns to Low at the Time Tn+4, and turns to High again at the time Tn+11, but the information capturing signal 403 turns to High at time Tn+8 and Tn+12. Since both of the timings are not synchronous, the selection circuit 303 does not change the selection signal.

As a result, a second data group 404 and a second data transmission instruction 405, which are outputted from the selector 302, have an identical timing with the first data group 401 and the second data transmission instruction 402. When converting the second data group 404 and the data transmission instruction 405 into the characters with using the information capturing signal 403, a transmission character group 406 can be obtained, and an interval between a character 435 converted from the data 430 and a character 445 converted from data 440 is two cycles of the characters.

Next, the following explanation deals with a case where information is captured in accordance with the information capturing signal 407 from the first data group 401 and the first data transmission instruction 402 in a second phase.

At the time Tn−1, the selection circuit 303 outputs the select signal to the selector 302 so that the selector 302 selects and outputs the signal from the communication control circuit 300 to the transmission circuit 304. More specifically, the first data transmission instruction 402 turns to High at the time Tn, whereas the information capturing signal 407 turns to High at the time Tn+1. Since the timing the first data transmission instruction 402 to start is not synchronous to the timing the information capturing signal to turn to High, the selection circuit 303 does not change the select signal.

Furthermore, the first data transmission instruction 402 once turns to Low at the time Tn+4, and turns to High again at the time Tn+11, but the information capturing signal 407 turns to High at the time Tn+9 and Tn+13, so that the selection circuit 303 also does not change the select signal.

As a result, a third data group 408 and a third data transmission instruction 409, which are outputted from the selector 302, have an identical timing with the first data group 401 and the first data transmission instruction 402. When converting the third data group 408 and the third data transmission instruction 409 into the characters with using the information capturing signal 407, a transmission character group 410 can be obtained, and an interval between a character 436 converted from the data 430 and a character 446 converted from the data 440 is two cycles of the characters.

Next, the following explanation deals with a case where information is captured in accordance with the information capturing signal 411 from the first data group 401 and the first data transmission instruction 402 in a third phase.

At the time Tn−1, the selection circuit 303 outputs the select signal to the selector 302 so that the selector 302 selects and outputs the signal from the communication control circuit 300 to the transmission circuit 304. More specifically, the first data transmission instruction 402 turns to High at the time Tn, whereas the information capturing signal 411 turns to High at the time Tn+2. Since the timing the first data transmission instruction 402 to start is not synchronous to the timing the information capturing signal to turn to High, the selection circuit 303 does not change the select signal.

Furthermore, the first data transmission instruction 402 once turns to Low at the time Tn+4, and turns to High again at the time Tn+11, but the information capturing signal 411 also turns to High at time Tn+10 and Tn+14, so that the selection circuit 103 does not change the select signal.

As a result, a fourth data group 412 and a fourth data transmission instruction 413, which are outputted from the selector 302, have an identical timing with the first data group 401 and the first data transmission instruction 402. When converting the fourth data group 412 and the fourth data transmission instruction 413 into the characters with using the information capturing signal 411, a transmission character group 414 can be obtained, and an interval between a character 437 converted from the data 430 and a character 447 converted from the data 440 is two cycles of the characters.

Finally, in a fourth phase, in a case where information is captured in accordance with the information capturing signal 415 from the first data group 401 and the first data transmission instruction 402, the selection circuit 303 outputs the select signal to the selector 302 at the time Tn−1 so that the selector 302 selects and outputs the signal from the communication control circuit 300 to the transmission circuit 304. More specifically, the first data transmission instruction 402 turns to High at the time Tn, whereas the information capturing signal 415 turns to High at the time Tn−1 and Tn+3. Since the timing the first data transmission instruction 402 to start is not synchronous to the timing the information capturing signal to turn to High, the selection circuit 303 does not change the select signal.

Furthermore, the first data transmission instruction 402 once turns to Low at the time Tn+4, and turns to High again at the time Tn+11, but the information capturing signal 415 also turns to High at the time Tn+11. At this point, the counter 305 counts time after the first data transmission instruction 402 turns to Low at the Tn+4, and outputs the information to the selection circuit 303.

Receiving the value, the selection circuit 303 judges that (a) the timing the first data transmission instruction 402 to turn to High from Low is approximately synchronous to the timing the information capturing signal 415 to turn to High and (b) a sufficient time has not passed since the previous data group had been transmitted. Then the selection circuit 303 outputs the control signal to the FIFO 301 so that the FIFO 301 outputs a signal that is a resultant of delaying for a cycle of the clock 400 with respect to the first data group 401 and the first data transmission instruction 402, and outputs the select signal to the selector 302 so that the selector 302 selects and outputs the signal from the FIFO 301. This ensures to change the first data group 401 and the first data transmission instruction 402 into a fifth data group 416 and a fifth data transmission instruction 417, respectively.

When converting the fifth data group 416 and the fifth data transmission instruction 417 into the characters with using the information capturing signal 415, a transmission character group 418 can be obtained, and an interval between a character 438 converted from the data 430 and a character 448 converted form the data 440 is two cycles of the characters.

As described above, according to the present invention, the data group and the data transmission instruction are delayed only when the interval between the data groups is short, so as not to delay a normal data group. Thus it is possible to broaden the interval of the characters indicating the data group, with respect to the data groups in which an interval between the data groups is short, and with respect to the data group and the data transmission instruction in which the interval between the data groups is shortened in such a case where the character conversion is carried out without using the present invention, as shown in FIG. 13, for example.

Note that, in the selection circuit 303, when the time after the termination of the transmission of the data group falls within a constant range, and the timing the data transmission instruction to turn to High from Low is approximately synchronous to the timing the information capturing signal to turn to High, the select signal and the FIFO control signal can be modified in order to broaden a range of the characters indicating the data group.

In this way, normally without causing a delay, it is possible to broaden the interval between the characters indicating the data group with respect to the data group and the data transmission instruction in which the interval between the data groups falls within a constant range, and the interval between the data groups is shortened after the character conversion without using the present invention as shown in FIG. 13, for example.

Third Embodiment

A further embodiment of the present invention is explained below, referring to FIGS. 3 and 5. Note that, a communication device shown in FIG. 3 is identical with that in the second embodiment, thus their detailed explanation is omitted.

Operations of the communication device shown in FIG. 3 are explained below, referring to a timing chart shown in FIG. 5.

Figure 5:
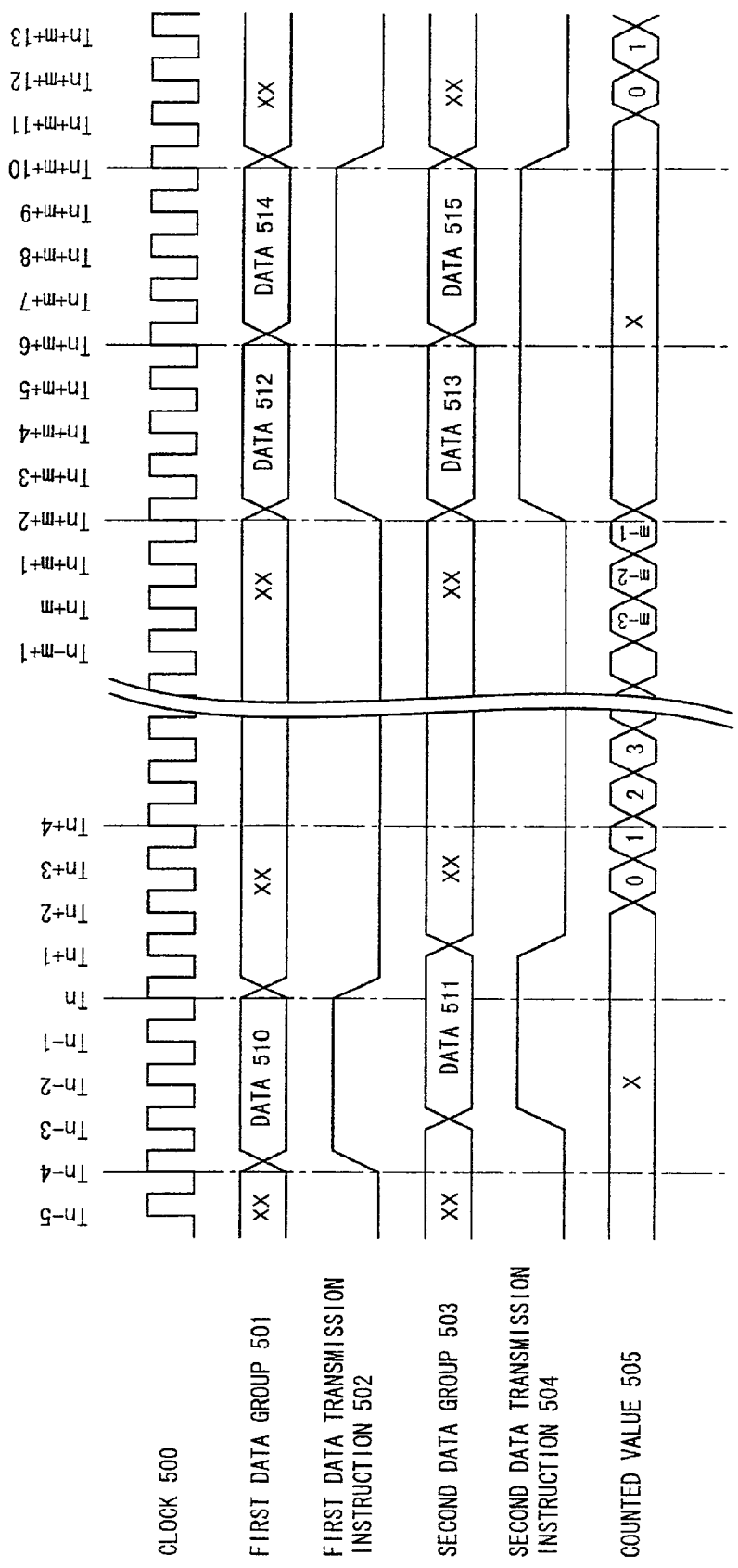
FIG. 5 is a diagram for explaining another example of an operation of data transmission by the communication device shown in FIG. 3.

As shown in FIG. 5, the following explanation deals with a case where a first data group 501 and a first data transmission instruction 502, which are supplied from the communication control circuit 300, are converted to a second data group 503 and a second data transmission instruction 504 with using the method described in the first or the second embodiment.

At the time Tn, the first data transmission instruction 502 turns to Low from High, and the converted second data transmission instruction 504 turns to Low from High at the time Tn+1, thereby terminating the data transmission in the transmission circuit 304.

Then the counter 305 starts counting in accordance with (a) the fact that the second data transmission instruction 504 turns to Low from High or the first data transmission instruction 502 turns to Low from High and (b) information relating to such as a delay amount of the data group and the data transmission instruction.

When the first data transmission instruction 502 does not turn to High until the counted value becomes m−2 (m is an integral number) which is a constant value, the selection circuit 303 outputs a signal to the selector 302 so that the selector 302 selects and outputs the signal from the communication control circuit 300 to the transmission circuit 304 at time Tn+m+1 when the counted value of the counter 305 becomes m−2.

Therefore, after the time Tn+m+1, the timing of the second data group 503 and the second data transmission instruction 504 is synchronous to the timing of the first data group 501 and the first data transmission instruction 502.

In this way, it is possible to restore the timing of the data group and the data transmission instruction to the normal timing. This ensures stable communication with fully maintaining the communication performance without increasing the delay amount.

Fourth Embodiment

Yet another embodiment of the present invention is explained below, referring to FIGS. 6 and 7. Note that, in the present embodiment, explained is a communication device including the transmission circuit applied with the communication method of the present invention. Furthermore, in the present embodiment, for convenience, only the data group and the data transmission instruction are used for explanation, but a device that additionally transmits the device state information can be explained in a same way as transmission operations of the data group and the data transmission instruction.

Figure 6:
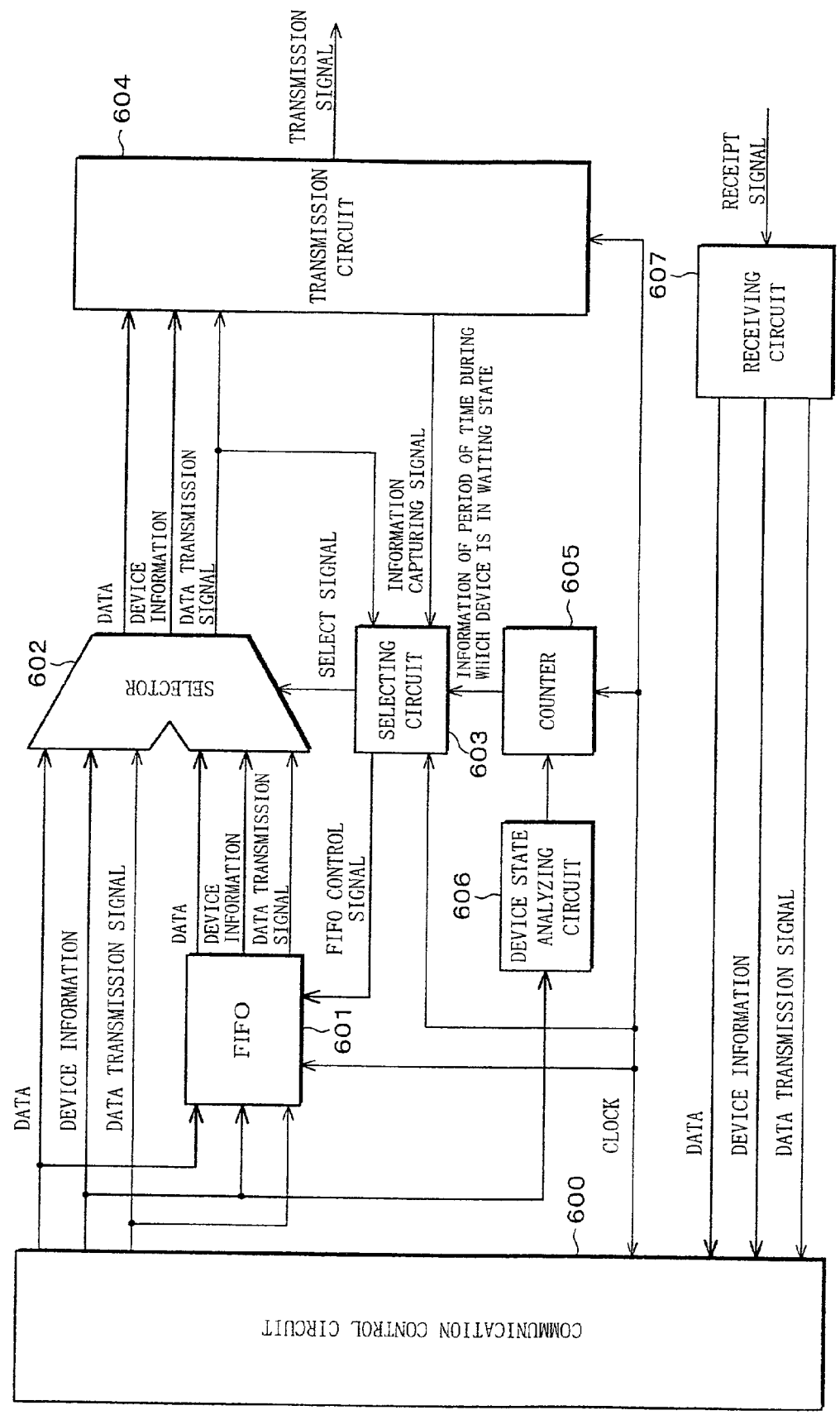
FIG. 6 is a schematic block diagram of a communication device in accordance with a fourth embodiment of the present invention.

The communication device in accordance with the present embodiment includes a communication control circuit 600, an FIFO 601, a selector 602, a selection circuit 603, a transmission circuit 604, a counter 605, a device state analyzing circuit 606, and a receiving circuit 607, as shown in FIG. 6.

Note that, the constituent members other than the device state analyzing circuit 606 have same functions as those of the communication device shown in FIG. 3 in the second embodiment, thus their detailed explanation is omitted here.

The device state analyzing circuit 606 receives device information from the communication control circuit 600, analyzes a device state in accordance with the device information, and then outputs to the counter 605 a signal indicating that the device is in a waiting state as a result of the analysis.

The counter 605 counts time during which the device is in the waiting state in accordance with the signal from the device state analyzing circuit 606, and outputs the counted value to the selection circuit 603 as information of the period of time during which the device is in the waiting state.

The selection circuit 603 generates the select signal to be outputted to the selector 602 and the FIFO control signal to be outputted to the FIFO 601 in accordance with (a) the information of the period of time during which the device is in the waiting state from the counter 605, (b) the information capturing signal from the transmission circuit 604, and (c) the data transmission instruction from the selector 602. The details are described later.

Operations of the communication device shown in FIG. 6 are explained below, referring to a timing chart shown in FIG. 7.

Figure 7:
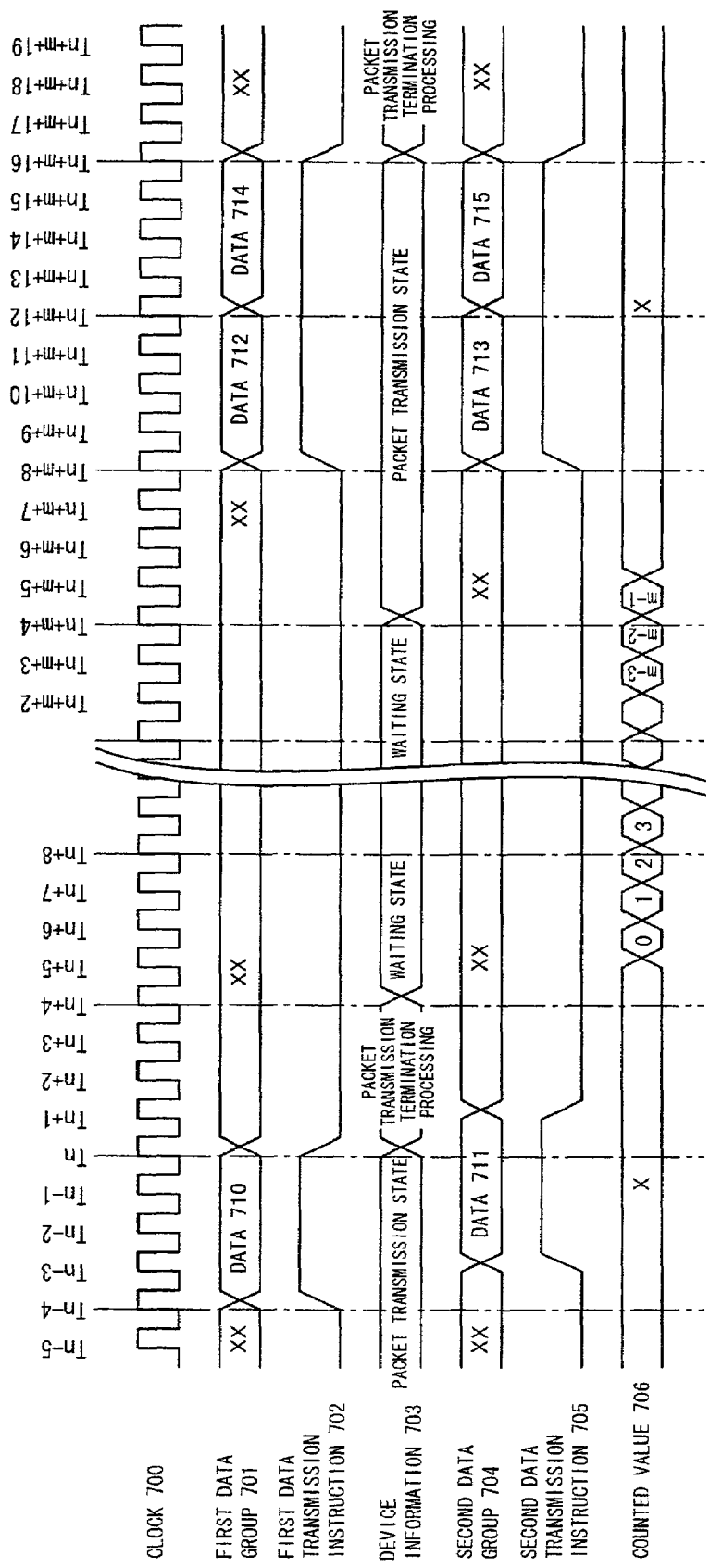
FIG. 7 is a diagram for explaining an operation of data transmission by the communication device shown in FIG. 6.

As shown in FIG. 7, the following explanation deals with a case where a first data group 701 and a first data transmission instruction 702, which are supplied from the communication control circuit 600, are converted to a second data group 704 and a second data transmission instruction 705 with using the method described in the first or the second embodiment.

At the time Tn, the first data transmission instruction 702 turns to Low from High, and the converted second data transmission instruction 705 turns to Low from High at the time Tn+1, thereby terminating the data transmission in the transmission circuit 604.

Device information 703 turns to a waiting state from a packet transmission state at the time Tn+4. From the time Tn+4, the counter 605 starts counting a duration of the waiting state by receiving the output from the device state analyzing circuit 606.

When the device information 703 remains in the waiting state until the counted value becomes m−2 (m is an integral number) which is a constant value, the selection circuit 603 outputs a signal to the selector 602 so that the selector 602 selects and outputs the signal from the communication control circuit 600 to the transmission circuit 604 at time Tn+m+4 when the counted value from the time Tn+4 of the device state analyzing circuit 605 becomes m−2.

Therefore, after the time Tn+m+4, the timing of the second data group 704 and the second data transmission instruction 705 is synchronous to the timing of the first data group 701 and the first data transmission instruction 702.

In this way, it is possible to restore the timing of the data group and the data transmission instruction to the normal timing. This ensures stable communication with fully maintaining the communication performance without increasing the delay amount.

Fifth Embodiment

Still another embodiment of the present invention is explained below, referring to FIGS. 8 and 9. Note that, in the present embodiment, explained is a communication device including the transmission circuit applied with the communication method of the present invention. Furthermore, in the present embodiment, for convenience, only the data group and the data transmission instruction are used for explanation, but a device that additionally transmits the device state information can be explained in a same way as transmission operations of the data group and the data transmission instruction.

Figure 8:
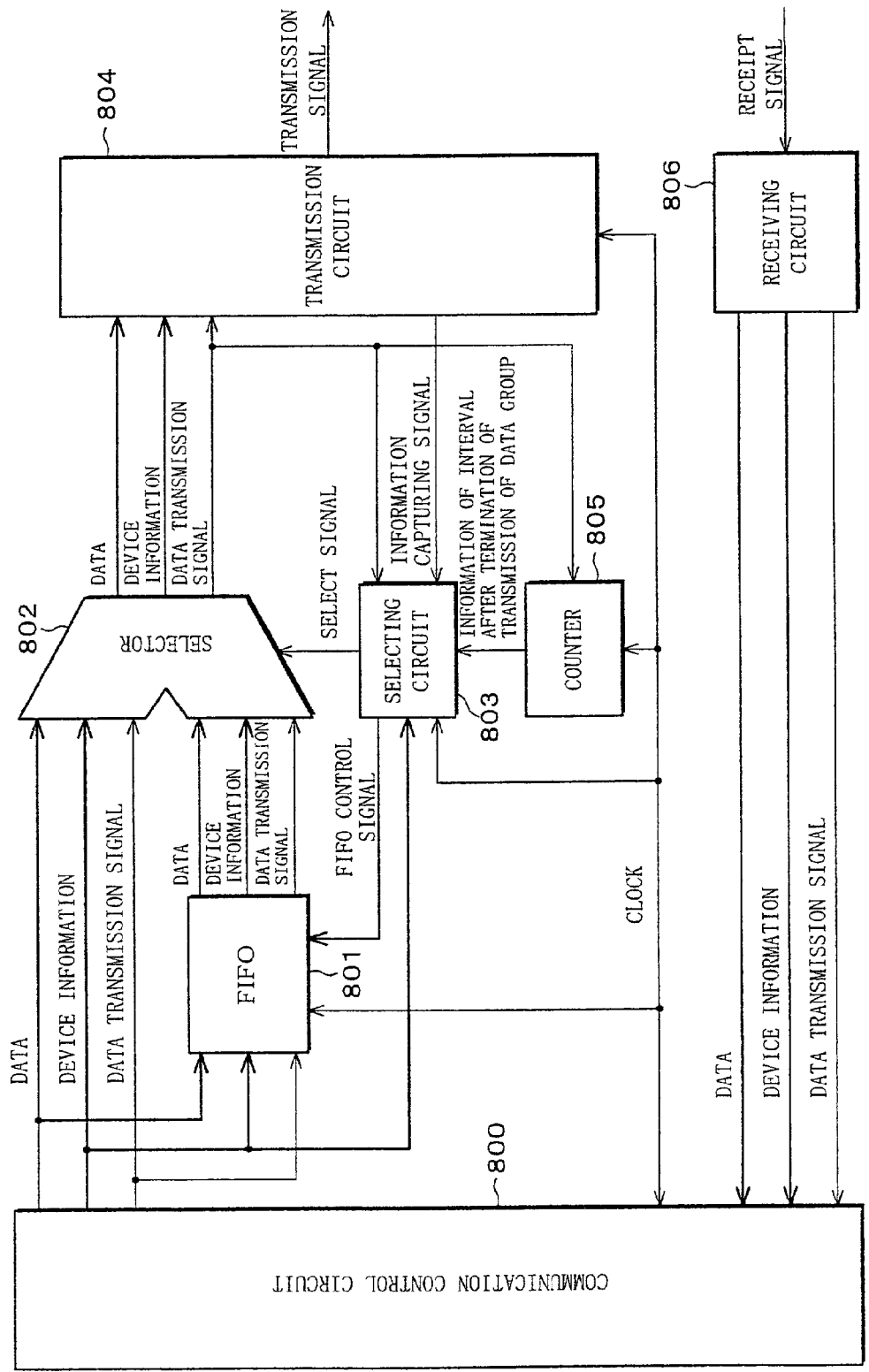
FIG. 8 is a schematic block diagram of a communication device in accordance with a fifth embodiment of the present invention.

The communication device in accordance with the present embodiment includes a communication control circuit 800, an FIFO 801, a selector 802, a selection circuit 803, a transmission circuit 804, a counter 805, and a receiving circuit 806, as shown in FIG. 8.

Note that, the constituent members of the communication device have same functions as those of the communication device shown in FIG. 3 in the second embodiment, thus their detailed explanation is omitted here.

Note that, the communication device in accordance with the present embodiment differs from the communication device shown in FIG. 3 in that the selection circuit 803 receives device information from the communication control circuit 800, as shown in FIG. 8.

Therefore, when generating an FIFO control signal to be outputted to the FIFO 801 and a select signal to be outputted to the selector 802, the selection circuit 803 uses the device information from the communication control circuit 800 in addition to the data transmission instruction from the selector 802, an information capturing signal from the transmission circuit 804, and information from the counter 805 as to an interval after the termination of the transmission of the data group.

Operations of the communication device shown in FIG. 8 are explained below, referring to a timing chart shown in FIG. 9.

Figure 9:
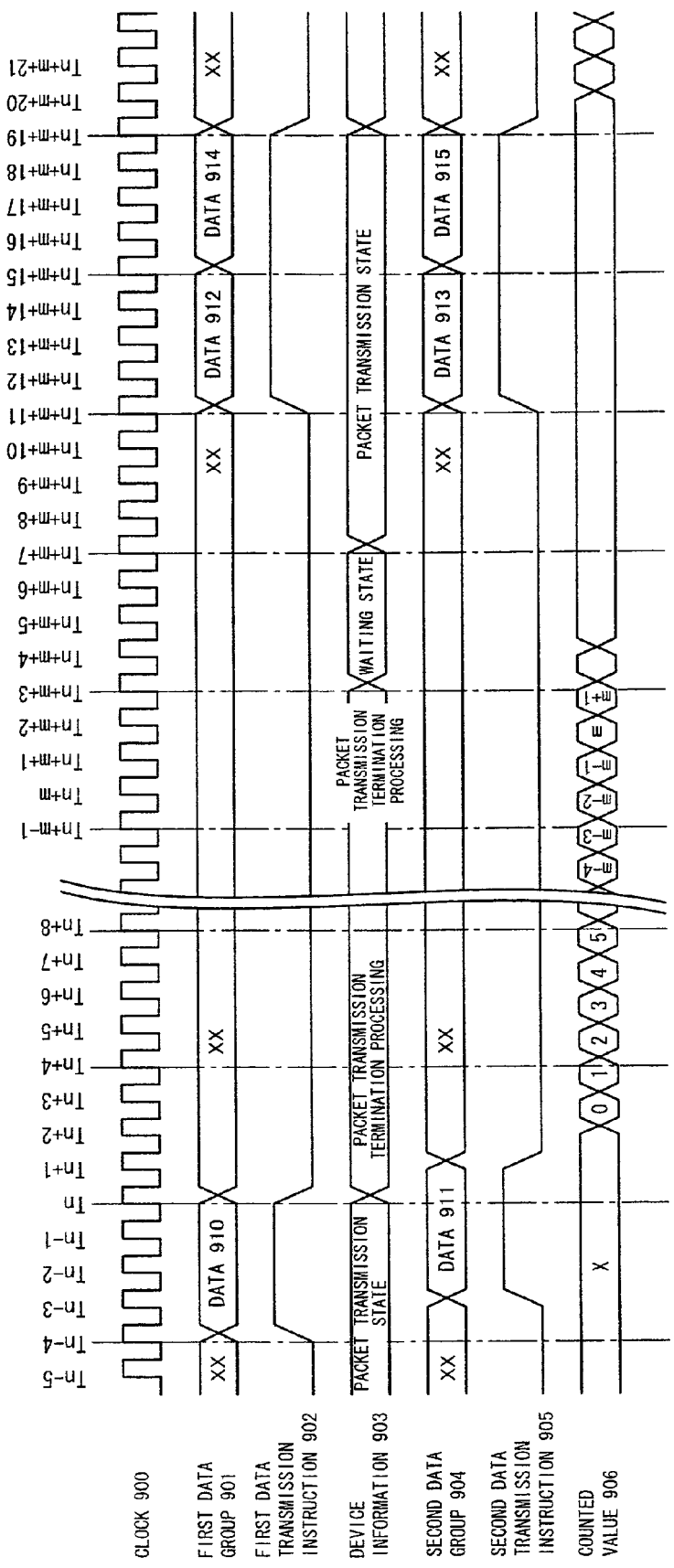
FIG. 9 is a diagram for explaining an operation of data transmission by the communication device shown in FIG. 8.

As shown in FIG. 9, the following explanation deals with a case where a first data group 901 and a first data transmission instruction 902, which are supplied from the communication control circuit 800, are converted to a second data group 904 and a second data transmission instruction 905 with using the method described in the first or the second embodiment.

The first data transmission instruction 902 turns to Low from High at the time Tn, and the converted second data transmission instruction 905 turns to Low from High at the time Tn+1, thereby terminating the data transmission in the transmission circuit 804. From the time Tn+1, the counter 805 starts counting.

When the first data transmission instruction 902 or the second data transmission instruction 905 does not turn to High until the counted value becomes m−2 (m is an integral number) which is a constant value, the selection circuit 803 waits until device information 903 turns to a waiting state after the time Tn+m+1 when the counted value from the time Tn+1 of the counter 805 becomes m−2. The selection circuit 803 outputs a signal to the selector 802 so that the selector 802 selects and outputs the signal from the communication control circuit 800 to the transmission circuit 804 after time Tn+m+3 when the device information 903 turns to the waiting state.

Therefore, after the time Tn+m+3, the timing of the second data group 904 and the second data transmission instruction 905 is synchronous to the timing of the first data group 901 and the first data transmission instruction 902.

In this way, it is possible to restore the timing of the data group and the data transmission instruction to the normal timing. This ensures stable communication with fully maintaining the communication performance without increasing the delay amount.

Sixth Embodiment

A still further embodiment of the present invention is explained below, referring to FIGS. 10 and 11. Note that, in the present embodiment, explained is a communication device including the transmission circuit applied with the communication method of the present invention. Furthermore, in the present embodiment, for convenience, only the data group and the data transmission instruction are used for explanation, but a device that additionally transmits the device state information can be explained in a same way as transmission operations of the data group and the data transmission instruction.

Figure 10:
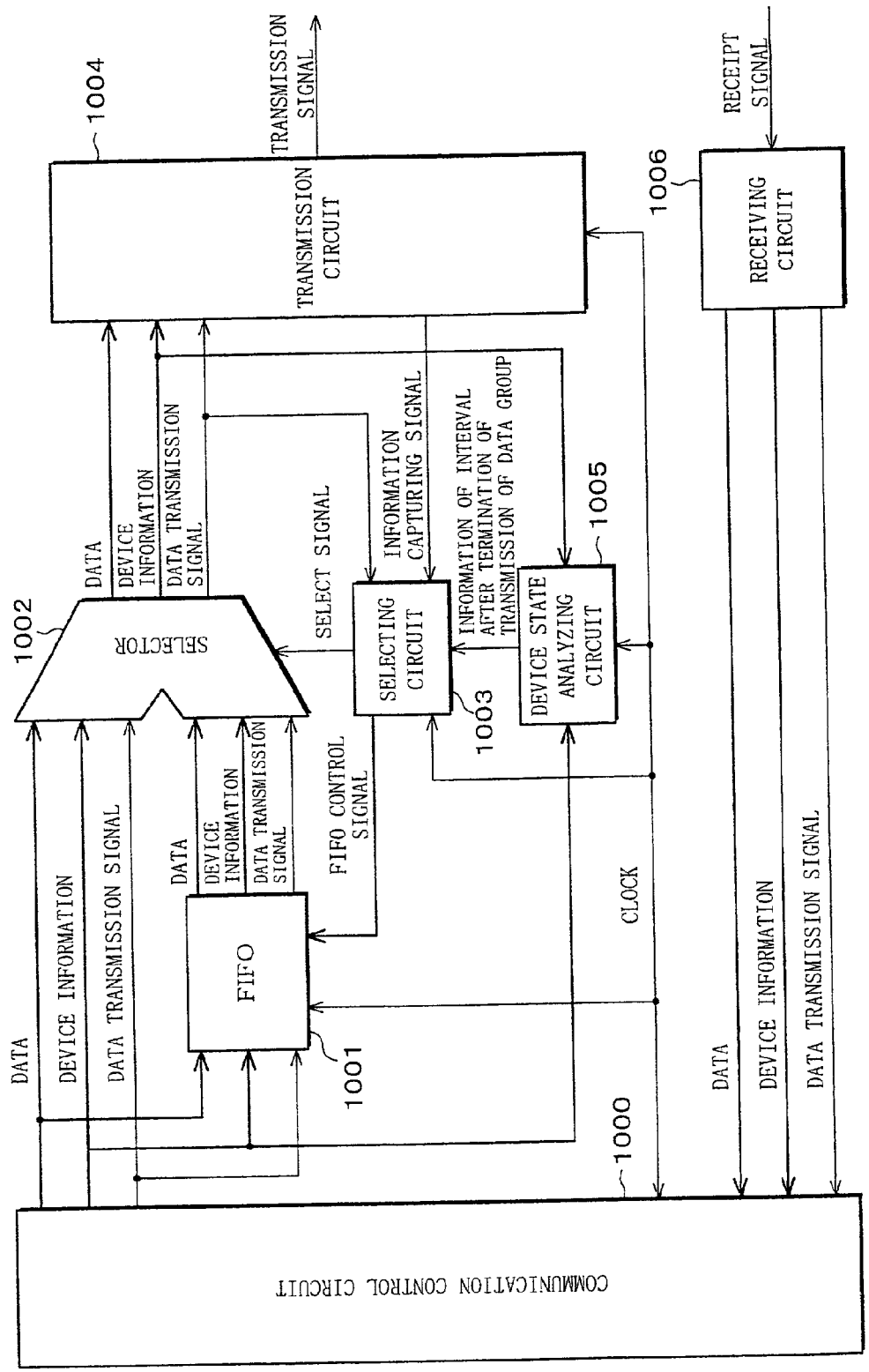
FIG. 10 is a schematic block diagram of a communication device in accordance with a sixth embodiment of the present invention.

The communication device in accordance with the present embodiment includes a communication control circuit 1000, an FIFO 1001, a selector 1002, a selection circuit 1003, a transmission circuit 1004, a device state analyzing circuit 1005, and a receiving circuit 1006, as shown in FIG. 10.

Note that, the constituent members of the communication device have same functions as those of the communication device shown in FIG. 3 in the second embodiment, thus their detailed explanation is omitted here.

Note that, in the communication device in accordance with the present embodiment, as shown in FIG. 10, the device state analyzing circuit 1005 is provided instead of the counter 305 in the communication device shown in FIG. 3.

The device state analyzing circuit 1005 receives device information outputted from the communication control circuit 1000 and device information outputted from the selector 1002, and outputs to the selection circuit 1003 an analysis result of the device state.

Operations of the communication device shown in FIG. 10 are explained below, referring to a timing chart shown in FIG. 11.

Figure 11:
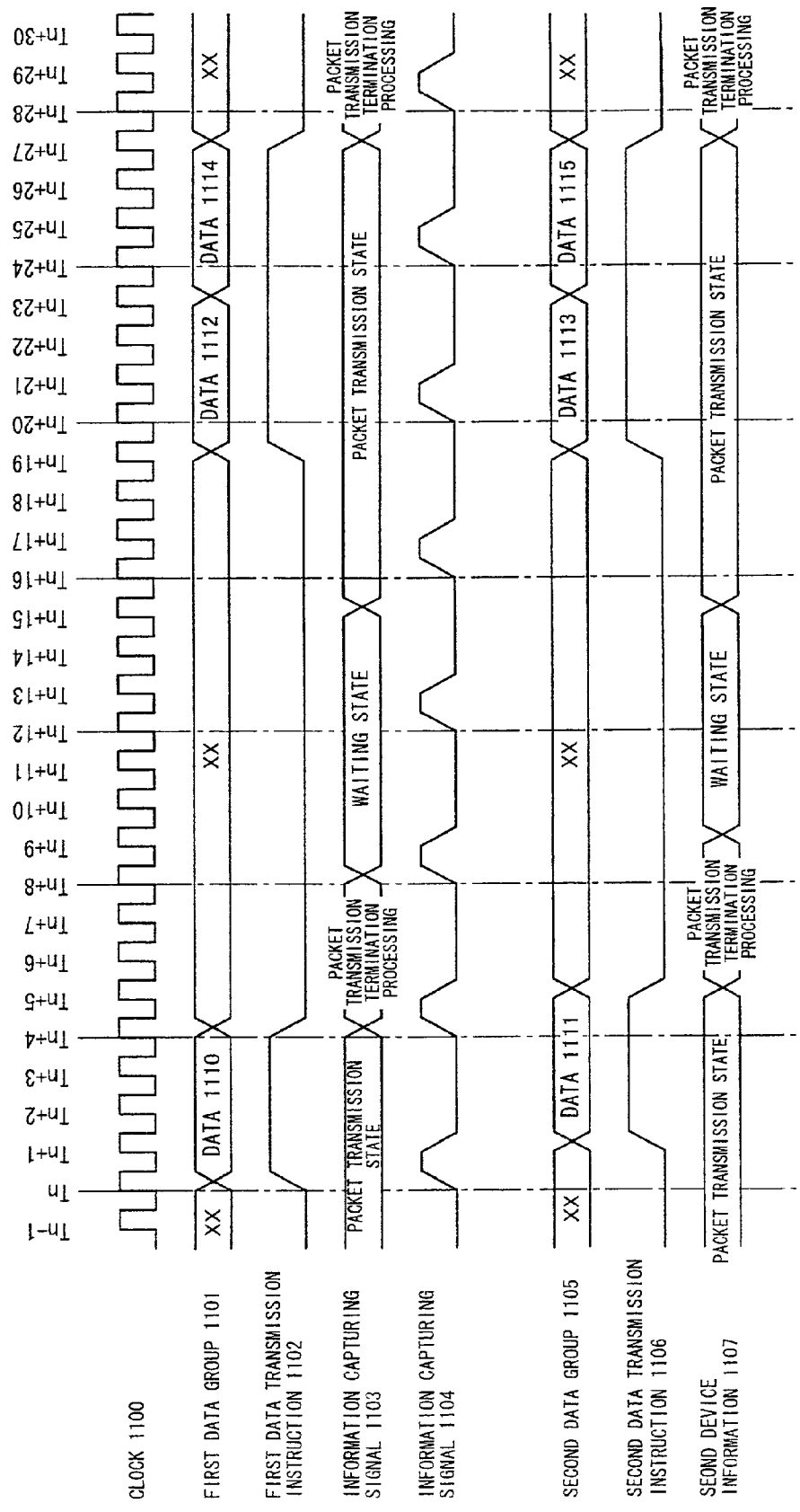
FIG. 11 is a diagram for explaining an operation of data transmission by the communication device shown in FIG. 10.

As shown in FIG. 11, the following explanation deals with a case where a first data group 1101 and a first data transmission instruction 1102, which are supplied from the communication control circuit 1000, are converted to a second data group 1105 and a second data transmission instruction 1106 with using the method described in the first or the second embodiment.

At the time Tn+4, the first data transmission instruction 1102 turns to Low from High, whereas the second data transmission instruction 1106, which is a resultant of delaying of the first data transmission instruction 1102 at the time Tn+5, turns to Low from High, thereby terminating the transmission of the data group. At this point, the character conversion is actually carried out at the time Tn+4 when an information capturing signal 1104 is High. When the timing is restored at the time Tn+5, packet transmission termination processing of the device information is not transmitted at the time Tn+8 when the information capturing signal 1104 is High, so that the timing is not restored before the time Tn+5.

At the time Tn+8, packet transmission termination processing of second device information 1107 is transmitted to the characters. When the timing is restored at the time Tn+8, the device information may be information other than the waiting state at the time Tn+12 when the next information capturing signal 1104 turns to High. In the case, a first device information 1103 and the second device information 1107 both turn to a state other than the waiting state and thus the waiting state is not transmitted, so that the timing is not restored at the time Tn+8.

At the time Tn+12, the first device information 1103 and the second device information 1107 both turn to the waiting state. At this point, the waiting state is outputted from the communication control circuit 1000, and converted into the characters. The timing is restored at the time Tn+12, so as to surely transmit the waiting state and carry out the conversion without a loss of a state other than the waiting state.

In this way, the timing can be restored, after at least one waiting state is subjected to the character conversion and is transmitted. This ensures stable communication with fully maintaining the communication performance without increasing the delay amount.

As described above, a data transmission method of the present invention, which is applied to a communication method in which transmission data are converted into characters and information is communicated per character unit, is arranged so as to have the step of broadening an interval between data groups after character conversion when the interval between the data groups after the character conversion is shorter than an interval between the data groups before the character conversion.

Therefore, it can be prevented that (a) a receiving device or (b) the other device to which the receiving device has transmitted the received data group via a channel in which a communication mode is not specified, cannot capture the data group when the interval between the data groups after the character conversion is shorter than the interval between the data groups before the character conversion.

Because of this, even when the interval of the data groups after the character conversion is different from the interval between the data groups before the character conversion, the receiving device can always receive the data group, thereby ensuring the transmitting device and the receiving device to stably communicate with each other.

Moreover, the interval between the data groups after the character conversion may be broadened when the interval between the data groups after the character conversion is shorter than the interval between the data groups before the character conversion and smaller than a constant value.

In this case, it is assumed that the receiving device cannot capture the data group when the interval between the data groups after the character conversion is smaller than the constant value which is specified as a reference value for judging whether the receiving device properly captures the data group. Then, the interval between the data groups after the character conversion may be broadened only when the interval between the data groups after the character conversion is shorter than the interval between the data groups before the character conversion and smaller than the constant value.

Therefore, the processing is not always carried out to broaden the interval between the data groups after the character conversion when the interval between the data groups after the character conversion is shorter than the interval between the data groups before the character conversion, thereby preventing an unnecessary delay.

Moreover, the interval between the data groups after the character conversion may be broadened when the interval between the data groups after the character conversion is shorter than the interval between the data groups before the character conversion and within a constant range.

In this case, it is assumed that the constant range is specified as a range in which the receiving device cannot capture the data group. Then, the interval between the data groups after the character conversion may be broadened only when the interval between the data groups after the character conversion is shorter than the interval between the data groups before the character conversion and within the constant range.

Therefore, the processing is not always carried out to broaden the interval between the data groups after the character conversion when the interval between the data groups after the character conversion is shorter than the interval between the data groups before the character conversion, thereby preventing the unnecessary delay.

For example, the constant value may be 720 ns, and the constant range may be 640 ns to 720 ns.

Moreover, transmission of the data group and of a transmission instruction of the data group before the character conversion may be delayed when a timing a transmission character to be determined is substantially synchronous to a timing the transmission instruction of the data group to start.

In this case, if the characters are transmitted when the timing the transmission character to be determined is substantially synchronous to the timing the transmission instruction of the data group to start, the interval between the data groups after the character conversion may become shorter than the interval between the data groups before the character conversion. Furthermore, when the transmission of the data group and of the transmission instruction of the data group before the character conversion is delayed, the interval between the data groups after the character conversion is broadened.

Therefore, the transmission of the data group and of the transmission instruction of the data group before the character conversion is delayed when the timing the transmission character to be determined is substantially synchronous to the timing the transmission instruction of the data group to start, thereby broadening the interval between the data groups after the character conversion and then transmitting the characters.

Because of this, like the three data transmission methods as described above, it can be prevented that (a) a receiving device or (b) the other device to which the receiving device has transmitted the received data group via the channel in which the communication mode is not specified, cannot capture the data group when the interval between the data groups after the character conversion is shorter than the interval between the data groups before the character conversion.

Then, even when the interval of the data groups after the character conversion is different from the interval between the data groups before the character conversion, the receiving device can always receive the data group, thereby ensuring the transmitting device and the receiving device to stably communicate with each other.

Furthermore, the timing the transmission character to be determined is compared with the transmission timing of the data group and of the transmission instruction of the data group so as to judge whether the interval between the data groups after the character conversion is broadened. This allows the interval between the data groups after the character conversion not to become shorter than the interval between the data groups before the character conversion in a simple arrangement.

Moreover, while the transmission of the data group before the character conversion is delayed, the transmission of the data group and of the transmission instruction of the data group, whose transmission has been delayed, may be further delayed when the timing the transmission character to be determined is substantially synchronous to the timing the delayed transmission of the data group and of the transmission instruction of the data group to start.

In this case, even in a state in which the transmission of the data group before the character conversion is delayed, i.e., even in a state in which the data groups are consecutively transmitted, the delayed transmission of the data group and of the transmission instruction of the data group is further delayed when the timing the transmission character to be determined is synchronous to the timing the delayed transmission of the data group and of the transmission instruction of the data group to start, thereby broadening the interval between the data groups after the character conversion and then transmitting the characters.

Moreover, it is preferable that delay amount of the transmission of the data group and of the transmission instruction of the data group is not less than a cycle of a clock for operating a communication device.

Moreover, it is preferable that delay amount of the transmission of the data group and of the transmission instruction of the data group is not more than a length of one character when original data are converted into the characters.

For example, when the delay amount of the data group and of the transmission instruction of the data group is larger than the length of one character, the delay amount becomes large, thereby deteriorating the communication performance in the communication device.

Therefore, when the delay amount of the data group and of the transmission instruction of the data group is smaller than a length of one character, it is possible to broaden the interval between the data groups after the character conversion with reducing the deterioration of the communication performance in the communication device.

The delay amount of the transmission of the data group and of the transmission instruction of the data group is optimized as described above so as to eliminate a need for storing useless information, thereby preventing a size of the circuit such as the FIFO for storing information in the communication device to be enlarged.

Moreover, transmission timings of the data group and of the transmission instruction of the data group, whose transmission has been delayed, may be restored when the interval between the data groups after the character conversion is a period not less than a constant period.

In this case, as described above, it is assumed that the constant value is specified as a reference value for judging whether the receiving device can properly capture the data group. Then, the receiving device can capture the data group when the interval between the data groups after the character conversion is not less than the constant period, thereby eliminating a need for delaying the transmission of the data group and of the transmission instruction of the data group. Furthermore, when the transmission of the data group and of the transmission instruction of the data group keeps being delayed, the interval between the data groups after the character conversion keeps being enlarged.

Therefore, the transmission timing of the data group and of the transmission instruction of the data group, whose transmission has been delayed, is restored when the interval between the data groups after the character conversion is not less than the constant period, thereby allowing the receiving device to surely capture the data group, and preventing the deterioration of the communication performance due to the enlargement of the delay amount of the transmission of the data group and of the transmission instruction of the data groups.

Moreover, transmission timings of the data group and of the transmission instruction of the data group, whose transmission has been delayed, may be restored when a communication device is in a waiting state for a period not less than a constant period.

In this case, when the communication device is in the waiting state for the period not less than the constant period, it is not required to broaden the interval between the data groups after the character conversion, so that the transmission timing of the data group and of the transmission instruction of the data group, whose transmission has been delayed, can be restored during the period without causing a problem.

Furthermore, the transmission timing of the data group and of the transmission instruction of the data group, whose transmission has been delayed, can be restored in accordance with the timing so as to prevent the delay amount of the transmission of the data group and of the transmission instruction of the data group to be unnecessarily enlarged.

Furthermore, when the interval between the data groups is not less than the constant period and when a communication device is in the waiting state for the period not less than the constant period, the transmission timing of the data group and of the transmission instruction of the data group, whose transmission has been delayed, can be restored.

In this case, the interval between the data groups after the character conversion is wide enough, and a state that is delayed when the device turns to the waiting state is restored, thereby preventing the delay amount of the transmission of the data group and of the transmission instruction of the data group to be enlarged, without causing a problem when the timing is restored to the original timing.

Moreover, transmission timings of the data group and of the transmission instruction of the data group, whose transmission has been delayed, may be restored at a time, when the data group and the transmission instruction of the data group are delayed several times.

In this case, the transmission timing is restored at a time to a state with no delay amount of the transmission of the data group and of the transmission instruction of the data group, thereby shortening the deteriorated state of the communication performance due to the enlargement of the delay amount.

Moreover, transmission timings of the data group and of the transmission instruction of the data group, whose transmission has been delayed, may be restored in stages, while the data group and the transmission instruction of the data group are delayed several times.

In this case, the transmission timing is restored in stages to the state with no delay amount of the transmission of the data group and of the transmission instruction of the data group, thereby preventing a deficiency in the communication device caused by discrepancy of communication timing due to a rapid change in the delay amount.

Moreover, when (a) the transmission of the data group and of the transmission instruction of the data group is delayed or (b) transmission timings of the data group and of the transmission instruction of the data group is restored, transmission of data corresponding to device state information may be also delayed or the transmission timing of the data corresponding to the device state information may be also restored.

In this case, it is possible to prevent deviation of the transmission timing of the data group and of the transmission instruction of the data group from the transmission timing of the data corresponding to the device state information.

Moreover, in a case where transmitting the data corresponding to the device state information, the transmission timing of the device state information may be restored, when an original device state and a delayed device state are both in a waiting state at a timing the transmission character corresponding to the device state information to be determined.

In this case, when the original device state and the delayed device state are both in the waiting state at the timing the transmission character corresponding to the device state information to be determined, it is not required to broaden the interval between the data groups after the character conversion, so that the transmission timing of the data group and of the transmission instruction of the data group, whose transmission has been delayed, can be restored during the period without causing a problem.

Moreover, the number of stages that can delay the transmission of the data group and of the transmission instruction of the data group may be controlled from outside.

In this case, a user who operates the communication device or an operator who is outside of the device such as an administrator who administrates the communication device can determine and control a desired delay amount of the transmission of the data group and of the transmission instruction of the data group.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A data transmission method, which is applied to a communication method in which transmission data, provided in data groups, are converted into characters and information is communicated per character unit, comprising the step of:

broadening an interval between the data groups after character conversion when the interval between the data groups after the character conversion is shorter than an interval between the data groups before the character conversion.

2. A data transmission method, which is applied to a communication method in which transmission data, provided in data groups, are converted into characters and information is communicated per character unit, comprising the step of:

broadening an interval between the data groups after character conversion when the interval between the data groups after the character conversion is shorter than an interval between the data groups before the character conversion, wherein:

the interval between the data groups after the character conversion is broadened when the interval between the data groups after the character conversion is smaller than a constant value.

3. The data transmission method as set forth in claim 2, wherein the constant value is 720 ns.

4. A data transmission method, which is applied to a communication method in which transmission data, provided in data groups, are converted into characters and information is communicated per character unit, comprising the step of:

broadening an interval between the data groups after character conversion when the interval between the data groups after the character conversion is shorter than an interval between the data groups before the character conversion, wherein:

the interval between the data groups after the character conversion is broadened when the interval between the data groups after the character conversion is within a constant range.

5. The data transmission method as set forth in claim 4, wherein the constant range is 640 ns to 720 ns.

6. A data transmission method, which is applied to a communication method in which transmission data, provided in data groups, are converted into characters and information is communicated per character unit, comprising the step of:

broadening an interval between the data groups after character conversion when the interval between the data groups after the character conversion is shorter than an interval between the data groups before the character conversion, wherein:

transmission of the data group and of a transmission instruction of the data group before the character conversion is delayed when a timing of a transmission character to be determined is substantially synchronous to a timing of the transmission instruction of the data group to start.

7. The data transmission method as set forth in claim 6, wherein:

while the transmission of the data group before the character conversion is delayed, the transmission of the data group and of the transmission instruction of the data group, whose transmission has been delayed, is further delayed when the timing of the transmission character to be determined is substantially synchronous to the timing of the delayed transmission of the data group and of the transmission instruction of the data group to start.

8. The data transmission method as set forth in claim 6, wherein:

delay amount of the transmission of the data group and of the transmission instruction of the data group is not less than a cycle of a clock for operating a communication device.

9. The data transmission method as set forth in claim 6, wherein:
delay amount of the transmission of the data group and of the transmission instruction of the data group is not more than a length of one character when original data are converted into the characters.

10. The data transmission method as set forth in claim 6, wherein:
transmission timings of the data group and of the transmission instruction of the data group, whose transmission has been delayed, is restored when the interval between the data groups after the character conversion is a period not less than a constant period.

11. The data transmission method as set forth in claim 6, wherein:
transmission timings of the data group and of the transmission instruction of the data group, whose transmission has been delayed, is restored when a communication device is in a waiting state for a period not less than a constant period.

12. The data transmission method as set forth in claim 6, wherein:
transmission timings of the data group and of the transmission instruction of the data group, whose transmission has been delayed, is restored at a time to a state with no delay of the transmission, while the data group and the transmission instruction of the data group are delayed in stages.

13. The data transmission method as set forth in claim 6, wherein:
transmission timings of the data group and of the transmission instruction of the data group, whose transmission has been delayed, is restored in stages to a state with no delay of the transmission, while the data group and the transmission instruction of the data group are delayed in stages.

14. The data transmission method as set forth in claim 6, wherein:
when (a) the transmission of the data group and of the transmission instruction of the data group is delayed or (b) transmission timings of the data group and of the transmission instruction of the data group is restored, transmission of data corresponding to device state information is also delayed or a transmission timing of the data corresponding to the device state information is also restored.

15. The data transmission method as set forth in claim 14, wherein:
in a case where transmitting the data corresponding to the device state information, the transmission timing of the data corresponding to the device state information is restored, when an original device state and a delayed device state are both in a waiting state at a timing the transmission character corresponding to the device state information to be determined.

16. The data transmission method as set forth in claim 6, wherein:
a delay amount by which the transmission of the data group and of the transmission instruction of the data group is able to be delayed is controlled from outside of a communication device.

17. A communication device for converting transmission data, provided in data groups, into characters and communicating information per character unit, said communication device comprising:
a transmission circuit for generating an information capturing signal in accordance with a cycle of characters into which the data groups are converted;
a selection circuit for generating a select signal in accordance with the information capturing signal generated by the transmission circuit; and
a selector for selecting one of the data groups and delayed data groups in accordance with the select signal generated by the selection circuit for output to the transmission circuit, wherein
the transmission circuit converts one of the data groups and the delayed data groups selected by the selector into characters to broaden an interval between data groups after character conversion when the interval between the data groups after the character conversion is shorter than an interval between the data groups before the character conversion.

* * * * *